US009877459B2

(12) United States Patent
Labrecque et al.

(10) Patent No.: US 9,877,459 B2
(45) Date of Patent: Jan. 30, 2018

(54) PIGLET DRYING APPARATUS

(71) Applicant: Conception Ro-Main Inc., St. Bernard (CA)

(72) Inventors: Germain Labrecque, St-Bernard (CA); Jacquelin Labrecque, St-Bernard (CA); Rudy Cabrera, Jr., St-Narcisse-de-Beau (CA)

(73) Assignee: Conception Ro-Main Inc, St. Lambert-de-Lauzon, QC (CA)

( * ) Notice: Subject to any disclaimer, the term of this patent is extended or adjusted under 35 U.S.C. 154(b) by 0 days.

(21) Appl. No.: 14/798,583

(22) Filed: Jul. 14, 2015

(65) Prior Publication Data

US 2017/0013800 A1 Jan. 19, 2017

(51) Int. Cl.
*A01K 1/02* (2006.01)

(52) U.S. Cl.
CPC .................................. *A01K 1/0218* (2013.01)

(58) Field of Classification Search
CPC ... A01K 1/0218; A01K 13/001; A01K 1/0227
USPC ....... 119/452, 673, 677, 678, 601, 602, 668, 119/508, 503, 606, 608
See application file for complete search history.

(56) References Cited

U.S. PATENT DOCUMENTS

| 1,230,237 A * | 6/1917 | Sturm | A01K 1/0218 119/507 |
| 1,439,157 A * | 12/1922 | Ford | A01K 5/025 119/446 |
| 1,875,433 A * | 9/1932 | Fitzpatrick | A01K 1/02 119/498 |
| 3,028,097 A * | 4/1962 | Johnson | A01K 1/0218 119/307 |
| 3,175,534 A * | 3/1965 | Pollard | A01K 13/001 119/174 |
| 3,181,503 A * | 5/1965 | Tripp | A01K 1/0218 119/508 |
| 4,292,927 A * | 10/1981 | Sassmann | A01K 1/0047 119/448 |
| 4,314,410 A * | 2/1982 | Nichols | A01K 13/001 119/452 |

(Continued)

FOREIGN PATENT DOCUMENTS

| CA | 1182005 | 2/1985 |
| CA | 2076739 | 2/1994 |

(Continued)

*Primary Examiner* — Yvonne Abbott-Lewis
(74) *Attorney, Agent, or Firm* — Adrian D. Battison; Ade & Company Inc.; Ryan W. Dupuis

(57) ABSTRACT

An apparatus for drying piglets immediately after birth includes a container shaped and arranged for receiving up to three or four of the piglets having an opening arrangement for manual insertion by the worker of the piglets to be confined within the container during a drying period. The container has a system for applying air movement and optionally heat to the piglets while confined with the container for drying and a release arrangement having a door controlled by a settable timer or a system for detecting when the piglets are dry for allowing release from the container of the piglets after a sufficient drying time period has elapsed. The container includes a base mounted in each farrowing crate and a cover portion which is removable from one crate to another.

25 Claims, 7 Drawing Sheets

(56) References Cited

U.S. PATENT DOCUMENTS

| | | | | |
|---|---|---|---|---|
| 4,348,986 A * | 9/1982 | Marrs | A01K 1/0218 119/508 |
| 4,462,335 A * | 7/1984 | Ahrens | A01K 1/0218 119/445 |
| 4,462,336 A * | 7/1984 | Kawakami | A01K 1/0218 119/503 |
| 4,471,719 A * | 9/1984 | Thomson | A01K 1/0218 119/446 |
| 4,478,175 A * | 10/1984 | Fisher | A01K 1/0227 119/448 |
| 4,559,903 A * | 12/1985 | Bloom | A01K 13/001 119/416 |
| 4,793,287 A * | 12/1988 | Hofmann | A01K 1/0218 119/505 |
| 5,140,947 A * | 8/1992 | Bruce | A01K 1/0218 119/502 |
| 5,283,962 A * | 2/1994 | Humann | A01K 13/001 119/482 |
| 5,372,091 A * | 12/1994 | Rhodes | A01K 15/02 119/505 |
| 5,622,138 A * | 4/1997 | Underhill | A01K 1/0218 119/503 |
| 6,439,165 B1 * | 8/2002 | Guard | A01K 1/0035 119/496 |
| 6,826,850 B2 * | 12/2004 | Jewell | F26B 9/003 34/202 |
| 7,165,509 B2 * | 1/2007 | Bryant | A01K 1/0218 119/446 |
| 7,921,813 B2 * | 4/2011 | Denison | A01K 13/001 119/600 |
| 8,098,163 B2 * | 1/2012 | Labrecque | A01K 1/0218 119/508 |
| D653,818 S * | 2/2012 | Schetlin | D30/158 |
| 8,186,307 B2 * | 5/2012 | Moharram | A01K 13/001 119/651 |
| 8,757,096 B2 * | 6/2014 | Doumas | A01K 13/001 119/606 |
| 9,451,758 B2 * | 9/2016 | Kaneda | A01K 13/001 |
| 2004/0025365 A1 | 2/2004 | Jewell | |
| 2007/0221137 A1 * | 9/2007 | Lareau | A01K 15/02 119/503 |
| 2007/0262859 A1 * | 11/2007 | Henry | A01K 1/0218 340/539.11 |

FOREIGN PATENT DOCUMENTS

| | | |
|---|---|---|
| CA | 2620523 | 7/2008 |
| EP | 0513981 | 11/1992 |
| GB | 2034568 | 6/1980 |
| WO | WO0230179 | 4/2002 |
| WO | WO2006127110 | 11/2006 |

* cited by examiner

PIGLET DRYING APPARATUS

This invention relates to an apparatus for use a method for raising piglets where one or more piglets are dried immediately after birth.

BACKGROUND OF THE INVENTION

Newborn piglets are covered with amniotic fluid. When drying, the amniotic fluid leaves a fibrous layer of skin that is then removed by contact between the animal and its environment. Until it is completely removed, this skin makes the complete drying of the animal very difficult. A wet piglet loses a lot of energy to maintain its body temperature during the evaporation process and often weakens to a point where it struggles in its search for the nipples. It is very important that each piglet feeds as early as possible after birth to receive an appropriate amount of colostrum which plays a very important role in its early development. In fact, colostrum promotes proper development of its immune system, not to mention it also provides energy.

To accelerate the drying process, some pig producers manually dry every single piglet with a towel. However, this practice is not widespread essentially because it is time-intensive. Other drying techniques are much less time consuming for the user since they are done without the constant input from the worker. These techniques include natural or synthetic drying powders, infrared heating, heating mats, etc. However their drying efficiency is much less than doing it manually.

Newborn piglets are very lethargic at farrowing. It takes a few minutes before they wake up and start their search for feed (nipples). Waking them up gently can accelerate this process.

Smaller, weak, and frail piglets usually get cold at birth and if left unattended, this may lead to what is called the vicious cycle of morbidity. As soon as the piglets get too cold, they will look to rest at a warm area or better yet huddle with its litter mates. This instinctive reaction delays the first feeding which prevents them from ingesting their share of the limited amount of colostrum. Furthermore, chilling predisposes these piglets to disease as well as crushing.

SUMMARY OF THE INVENTION

It is one object of the invention to provide an apparatus or method that can rapidly and efficiently dry the newborn piglets, wake them up comfortably, and orient them towards the nipples so that the time interval between farrowing and first feeding is decreased.

According to the invention there is provided a method for using in raising piglets comprising:

in a farrowing area for a pregnant sow, providing a container for receiving one of more piglets after birth of the piglets while the piglets are in a wet condition from the birthing process;

causing said one or more piglets to be located in the container;

applying air movement and optionally heat to said one or more piglets within the container sufficient to cause drying of the piglets from the wet condition;

and maintaining said one or more piglets confined with the container temporarily until substantially dried from the wet condition.

According to another definition of the invention there is provided an apparatus for using in raising piglets comprising:

a container shaped and arranged for receiving one of more piglets;

the container having an opening arrangement for insertion of said one or more piglets to be confined within the container;

the container having an air movement system and optionally heating system for applying drying air to said one or more piglets within the container sufficient to cause drying of the piglets from the wet condition;

the container being arrange to maintain said one or more piglets confined with the container temporarily until substantially dried from the wet condition.

According to another definition of the invention there is provided a farrowing apparatus for use in raising piglets comprising:

a frame arrangement for retaining a sow in a farrowing area;

and a container arranged to be located within the frame arrangement shaped and arranged for receiving one of more piglets;

the container having an opening arrangement for insertion of said one or more piglets to be confined within the container;

the container having an air movement system and optionally heating system for applying drying air to said one or more piglets within the container sufficient to cause drying of the piglets from the wet condition;

the container being arrange to maintain said one or more piglets confined with the container temporarily until substantially dried from the wet condition.

Preferably after the drying action is complete, the piglet is released from the container.

The release may be by way of an action of the control system to open a release door or opening or in an alternative simplified arrangement, the piglets may be removed manually by the worker who may also simply manually switch off the drying action.

The time period of the drying action may be controlled by a timer which approximates the drying time required or could also be determined by sensor which uses humidity or other parameters to actually detect the amount of drying which has occurred. That is the sensor acts to detect a condition after sufficiently drying the one or more piglets.

That is a system without a controller such as with a simple ON/OFF drying switch can also be used in this concept.

The drying container in order to provide a drying action within a temporary time period is arranged preferably for optimizing variables to optimize drying air velocity, temperature, humidity.

This arrangement can be used in conjunction with a system in which there is provided a compartment at a level below the pen floor in which piglets slide after birth and which protects them until they are ready to return to the pen to access the sow. Thus in the present arrangement, the piglets can automatically enter the drying device and are allowed to leave only once they are dry. The system can include a detector which operates to start automatically as the piglets enter.

The arrangement can include detectors which carry out an analysis of system variables to determine when piglets are completely dry to stop the drying process instead of a timer.

The arrangement can include a closed-loop system to manage and optimize the drying process variables (power to heater, fan speed, etc.) in reaction to input variables (temperature, humidity, air speed, etc.) instead of pre-determined conditions The arrangement can include a heat exchanger or air mixer to increase heating efficiency While the dryer is proposed for use generally in farrowing area that is a barn or other area set up for farrowing sows, it is not necessarily mounted directly inside a single farrowing pen or crate but could be placed on top of the stall or at some other suitable location. Obviously, if not located on or at the floor of the pen, this would not allow a door to be opened to simply release and orient the piglets toward the nipples but this feature is not essential.

As used herein the definition of a container is something to contain the piglets and that it can be anything that restricts the piglets from escaping until they are dry. For example, a ventilation and heating system could be installed in a creep assembly with some gates to keep the animals in until they are dry. This is included herein so that the definition of a container is something to "contain". The container does not need to be fully enclosed or to be manufactured as an integral device since any system that contains or confines the animal for the period of its drying action can be included.

As described in more detail hereinafter, the preferred arrangement provides a box in which up to three or four piglets can be placed at the same time. Other arrangements could allow more than 4 piglets. The objective is to dry all the newborn piglets at the same time when the worker sees them. Usually, not more than 3-4 piglets are delivered at a time and a timely (every 15-20 minutes) observation allows the worker to retrieve them. A preferred use of the drying device herein is to use it each time one or more newborn piglets are found.

A heating device (convective and/or radiant and/or conductive) is provided to control the enclosed air temperature and the piglet surface temperature, optimizing the evaporation rate and keeping the piglet comfortable which is an important factor. A simple cold air velocity would dry the piglets but would not do it so that they are comfortable. This would cause a stress which should be avoided. Also, it is important to understand that rising the piglet's skin temperature make sure they don't use their energy to heat up their body to reach a comfortable temperature.

A preferred configuration maximizes energy efficiency by having a heat exchanger system or a mixer to pre-heat incoming air with the hot air exhausted from the drying device.

A fan creating an air flow in and out of the box is provided to maximize drying. Moreover, the fan is arranged so that the air velocity and turbulence act to break the thin skin layer and thus remove it faster than contact with the environment.

A preferred design is arranged to let enough air to enter the box such that the relative humidity is kept at a level at which evaporation is good while minimizing the air flow rate to minimize energy consumption to keep the environment inside the box at an optimized temperature for both drying and piglet comfort.

A preferred configuration has a door that automatically unlocks when the drying process is over where this door can simply unlock so that the piglets can open it by themselves. However, more preferably, an automatically opening door (spring loaded or other type of actuator) is provided.

Preferably the outlet, as the piglet escapes the door, is arranged so that the piglet is directed towards the sow's teats.

The system preferably includes an automatic controller (closed-loop control system) that adjusts system variables (power to heater, fan speed, etc.) in real time to account for variation in controlled variables that can influence the rate of evaporation from the body of the piglet (inside humidity, temperature, air velocity, etc.).

A preferred configuration has a pre-set timer that stops the system automatically when the piglets are dry.

A preferred configuration has different modes to take into account the number and/or size of piglets to dry. Each mode is simple to activate and starts the system with the proper configuration to efficiently dry the piglets.

One frame of the device should be found in each pen to eliminate cross-contamination between pens. To reduce costs for the pig producer, the electromechanical parts of the device (fans, heaters, controllers, etc.) can be easily removed and used by simply coupling them to another frame in another pen. The frame preferably consists of a floor on which the animals will stand and at least two walls to enclose the animals and drying environment. The best would be four walls thus fully confining the piglets, but the number of walls can be varied and might change to less and also to no walls.

The rate of evaporation can be increased by adding a mixing fan inside the device to increase air speed at the surface of the animal, thus increasing rate of evaporation.

While manual insertion of the piglets is preferred, an alternative arrangement which reduces worker participation can include a funnel to guide piglets into the box without intervention and automatic control by which, upon sensing the presence of a piglet, the drying components is activated automatically and begins drying the piglets as they enter.

The drying device can be integrated into a complete farrowing pen solution.

The frame can include a see-through cover to allow the worker to observe the drying process and intervene if necessary.

The apparatus may include the following features:

should be easy to use and energy efficient.

preferably works on electrical power.

preferably provides sufficient drying action so that the piglets are dried in less than 5 minutes.

is arranged so that the piglets inside the box wake up due to air velocity and/or heat.

the housing is arranged so that it fits in a farrowing pen, preferably at the back of it.

an outlet door is preferably directed towards the nipples of the sow. As soon as the piglet is dry and awake, it is more active in searching the nipples. Therefore, opening the door in the direction of the nipples increases the chances of it finding them.

the housing is arranged so that it is easy to wash and disinfect. This can imply a modular design of the system allowing users to remove components for servicing without fear of damaging the product.

The housing is preferably modular so that the heating and ventilation components are a detachable compartment that can be easily removed, taken to a new location and re-fastened. This compartment can be coupled with a removable cover and door sub-assembly that may simply be installed on top of the frame. The use of a cover only is the preferred solution. It is however important that the electromechanical components should be easily moved from one frame assembly to the other so that the producer needs less electromechanical assemblies because they would be the most expensive parts. All sows do not farrow at the same moment so this assembly can be moved to a sow starting farrowing after the farrowing of another sow Preferably, the materials in contact with the animals are antibacterial.

Preferably, the floor surface is non-skid so that animal can easily stand without slipping bearing in mind that that they are very fragile at this age.

Preferably, there is a window or transparent section through the device so that the worker can see what is happening inside.

Preferably, the device is made of thermally insulating material to maximize energy efficiency.

The arrangement disclosed herein may provide one or more of the following additional benefits:

Drying all the piglets prevents the floor from being slippery (much dryer environment) and thus makes it easier and safer for the piglets to move around.

Piglets can seem weak at birth for many reasons one of which is being subject to a colder environment. Drying all the piglets eliminates this last factor and makes it easier to identify the real cause of weakness.

The arrangement disclosed herein may provide one or more of the following additional features:

The whole system should be easy to transfer from one side of the farrowing pen to the other. This pertains to the sow's natural behavior of switching sides during farrowing. When newborn piglets are found, the user should place the device on one side or the other according to the orientation of the sow at that moment.

there can be provided an arrangement to integrate an additional drying agent. For example, the drying agent could be powdered automatically on the piglets. It could also be spread on the floor to make it non-slippery and help to dry the piglets.

The controller may be arranged to monitor one or multiple system variables to analytically determine when the piglets are dry and automatically stop the device.

the electromechanical components can be arranged so that they can be easily moved from one frame assembly to the other so that the producer needs less electromechanical assemblies because they will be the most expensive parts. All sows do not farrow at the same moment so this assembly can be moved from the pen of a sow that is finished farrowing to a sow that is starting farrowing.

The top assembly can be lifted as a whole for insertion of piglets or may have a door through which the piglets can be inserted.

The drying device is not intended to be a heated comfort zone for the piglets. Its main purpose is to dry them comfortably, raise and keep their body temperature at an optimal level, and direct them to the nipples. Piglets may choose to stay inside the device. In such cases, the worker would remove and direct them manually to the nipples before putting newborn ones inside for drying.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
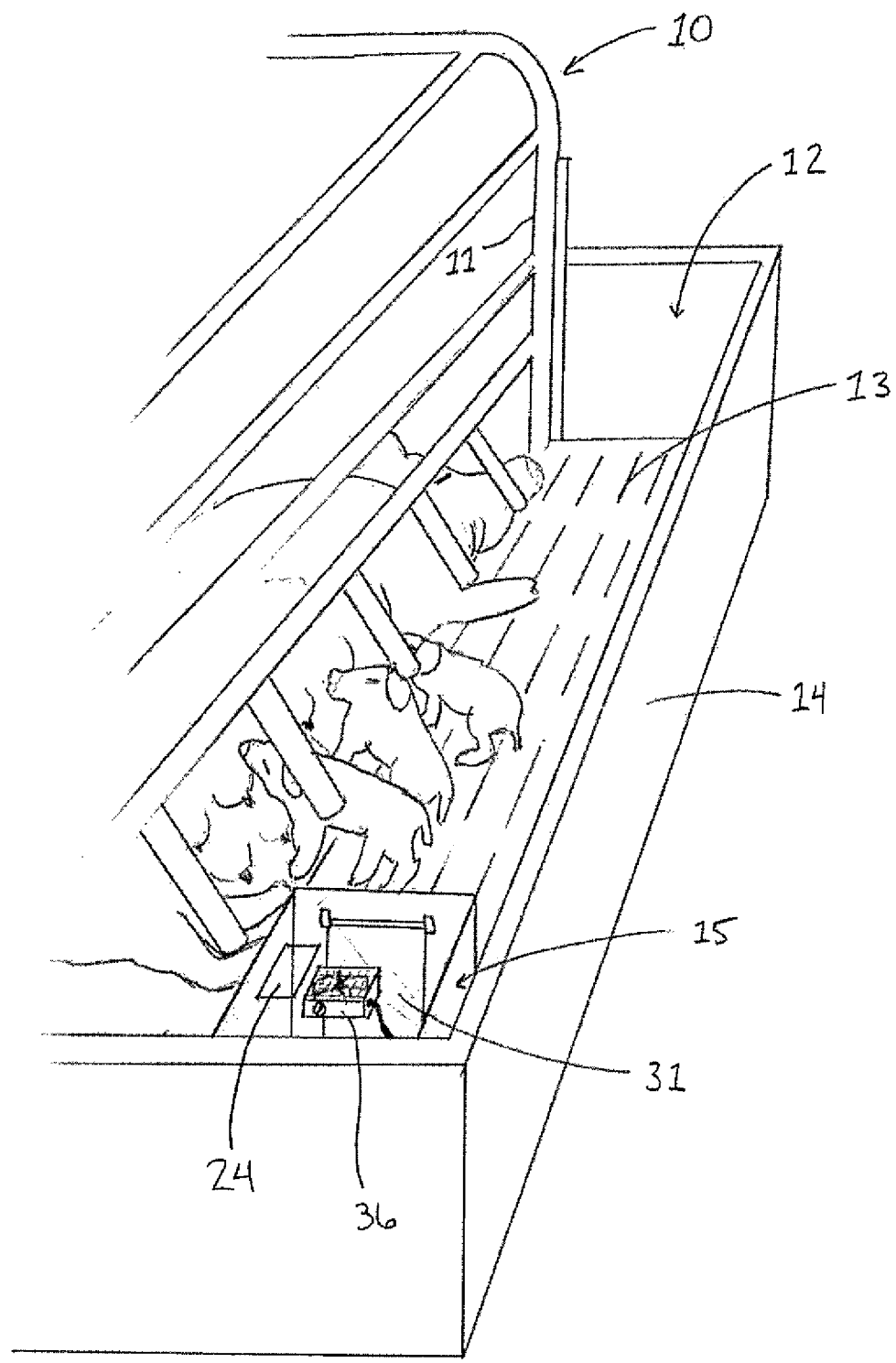
FIG. 1 is an isometric view of a farrowing crate including a drying system according to the present invention.
Figure 2:
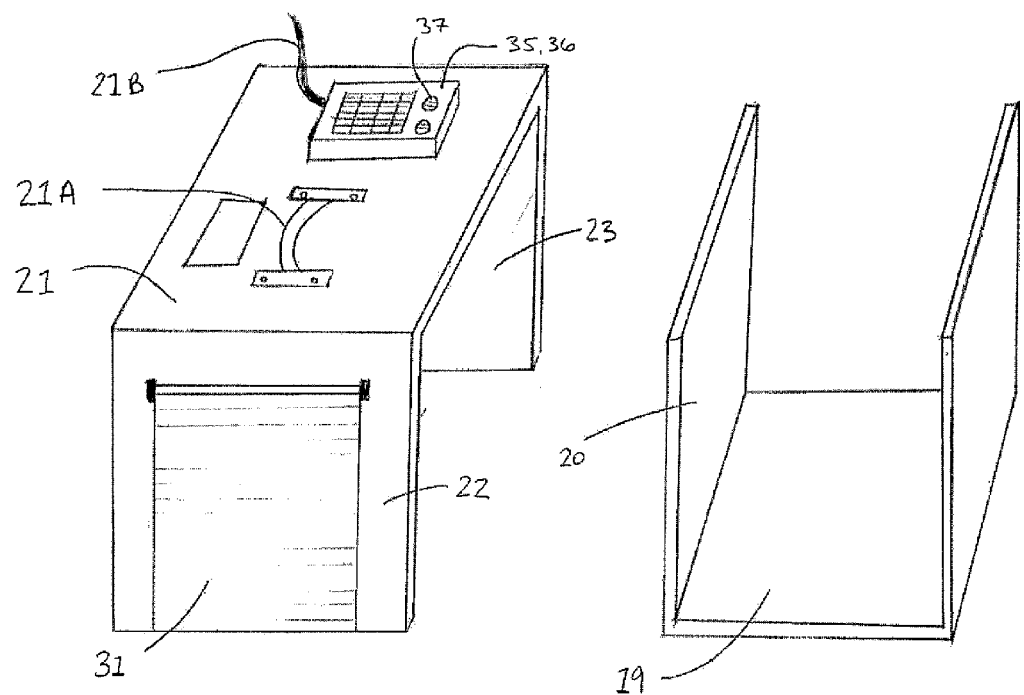
FIG. 2 is an isometric view of the dryer components of FIG. 1.
Figure 3:
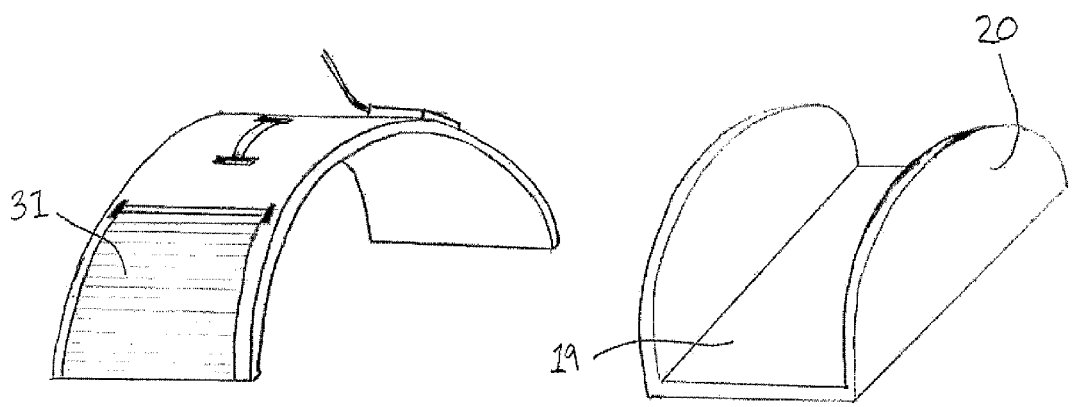
FIG. 3 is an isometric view of a second embodiment of dryer according to the invention.
Figure 4:
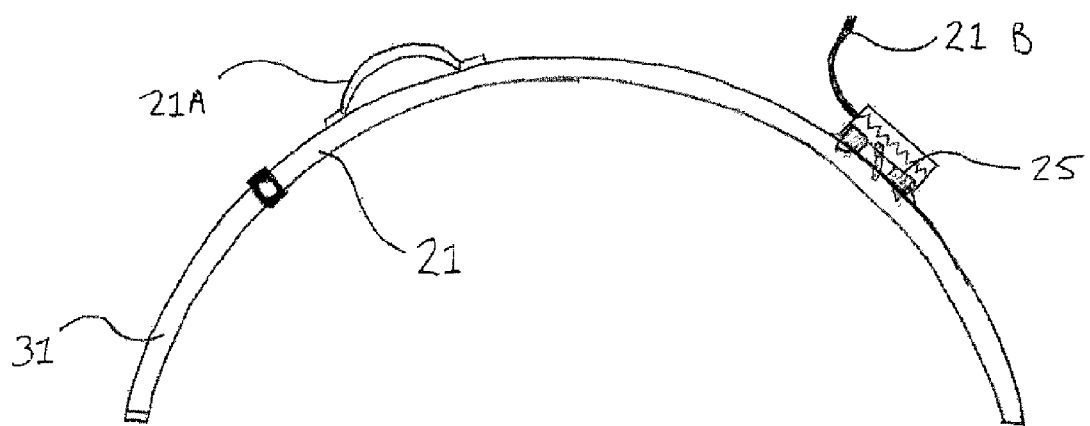
FIG. 4 is a side elevational view of the cover of FIG. 3.
Figure 5:
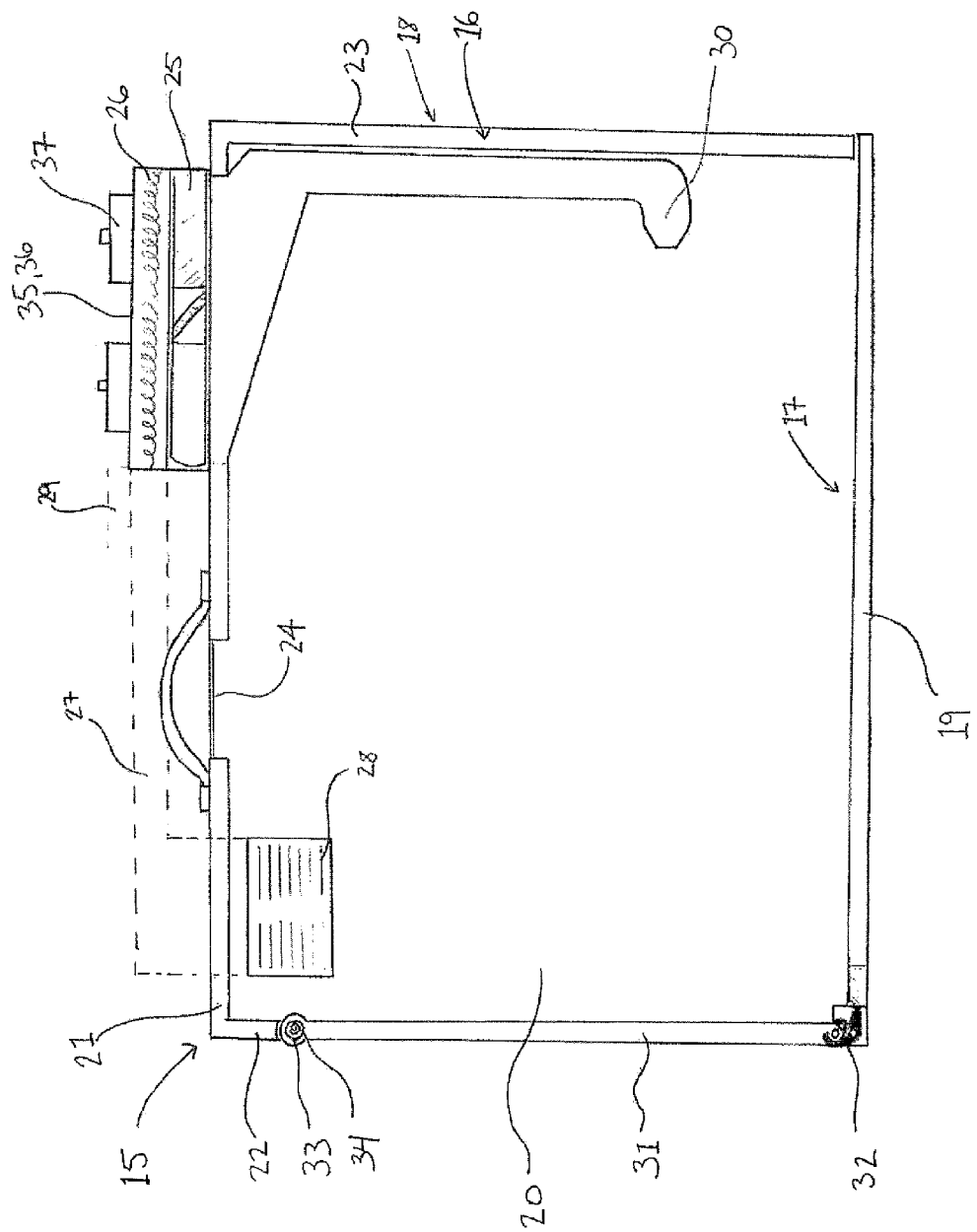
FIG. 5 is a cross-sectional view of the dryer of FIG. 2.

FIG. 1 shows a farrowing area for a pregnant sow, which may be provided by a specific farrowing crate 10 for each show including a central frame 11 for confining the sow and two side areas 12 for the piglets after birth and up to weaning. The side area 12 includes a floor 13 which may include a heated area or mat and a confining wall 14.

Within the area 12 is provided a drying container 15 for receiving one or up to four of the piglets after birth of the piglets while the piglets are in a wet condition from the birthing process. The container comprises a housing 16 dimensioned to receive the piglets standing or lying side by side along the length of the container so that a typical container would have dimensions of 18 inches by 12 inches and 12 inches high.

After birth attended by the worker, the piglets, which typically are born in batches of 2 to 4 are located in the container by the worker immediately after the birth by the worker lifting them manually into the container and placing them side by side within the container. In order to enable the piglets to be easily inserted into the container, there is provided an opening for manual insertion of the piglets.

Thus the container includes a base portion 17 and a cover portion 18 where the cover portion can be lifted for manual insertion of the piglets or can include a door through which piglets can be inserted. The base portion includes bottom or floor 19 and confining walls 20 which as shown include two side walls so that the piglets are dropped onto the floor and held confined by the sides. The separate cover includes a top wall 21 and front and rear walls 22 and 23. The cover can include a transparent panel 24 to allow viewing of the piglets.

For simple operation, there is provided a plurality of separate base portions 17 each arranged to be located in a separate farrowing area and associated with a single cover portion 18 which is movable from one farrowing area to another with the worker as births occur in the farrowing sows. The cover portion includes components for generating heat and air movement including a fan 25 and a heating element 26 which cooperate with designed vents 28 to provide the best drying air flow. A duct 27 may be provided to return the air from the vents to the intake of the fan with a humidity control 29 to ensure the best air condition for the drying action. The fan is arranged with nozzles 30 or vents to direct the air onto the piglets to provide sufficient air movement to break down the film or skin which is present on the piglet. The cover includes a handle 21A in the top wall 21 and an electrical coupling 21B for supplying power to the drying components from a suitable supply within the farrowing area.

The cover 18 includes a door 31 at the front with a hinge 33 shown at the top but at any suitable location and a latch 32 shown at the bottom but again at any suitable location. The latch 32 is operated by a control unit 35 which includes a timer 36 operable by a switch 37.

The piglets are therefore confined within the container for drying and, after a time period determined by the timer 36 and switch 37 to be sufficient to dry the piglets from the wet condition, the piglets are released from the container by release of the latch 32 and by the door being opened by a spring 34 or by the piglets pushing their way out for example to escape the vigorous air flow.

As shown in FIG. 1, the closable opening at the door 31 is directed toward the nipples of the lying sow in the farrowing area.

The cover and the latched door 31 may be arranged so that when the piglets are placed into the container by the worker they cannot enter or re-enter the container since the door is closed and the cover is in place. Thus the container may not be intended to operate as a warm area for the piglets to return after they have been released from drying. Thus the worker will typically remove the cover portion after the drying action is competed for all piglets in the litter. The drying device is not intended to be a heated comfort zone for the piglets. Its main purpose is to dry and direct them to the nipples. Piglets may choose to stay inside the device. In such cases, the worker would typically remove and direct them manually to the nipples before putting further newborn ones inside for drying.

The timer has different modes to take into account the number of piglets to dry and each mode is arranged to start the system with the proper configuration of the fan and humidity control to efficiently dry the piglets.

Figure 6:
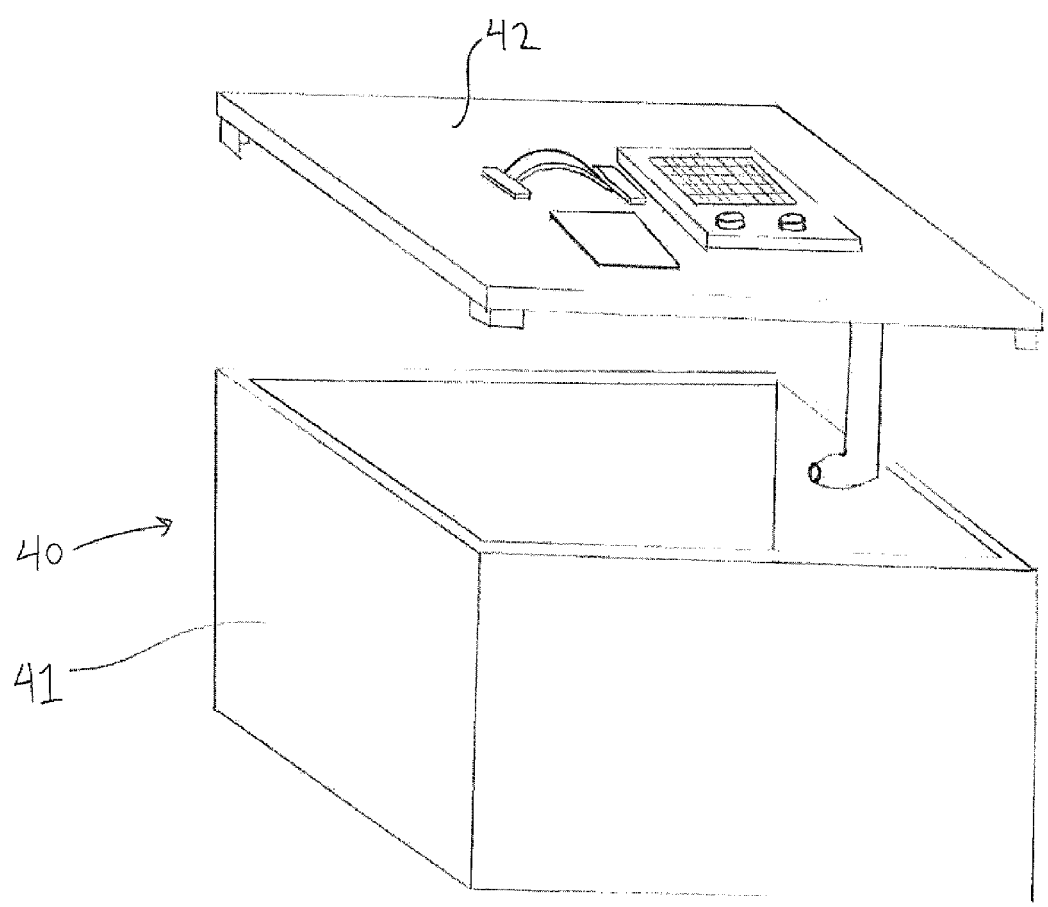
FIG. 6 is an isometric view of a modified arrangement having a container with four walls in the pen where the operating components are provided on a component which simply forms the cover.

FIG. 6 shows container 40 with four walls 41 in the pen where the operating components are provided on a component which simply forms the cover 42. Thus in this arrangement the worker lifts the piglets into the open top of the base when born and removes them after a period of time for drying. This arrangement does not require control of the release by a timer or sensing system, but may provide a timer or sensing indication to the piglets when the dried condition is detected or expected.

Figure 7:
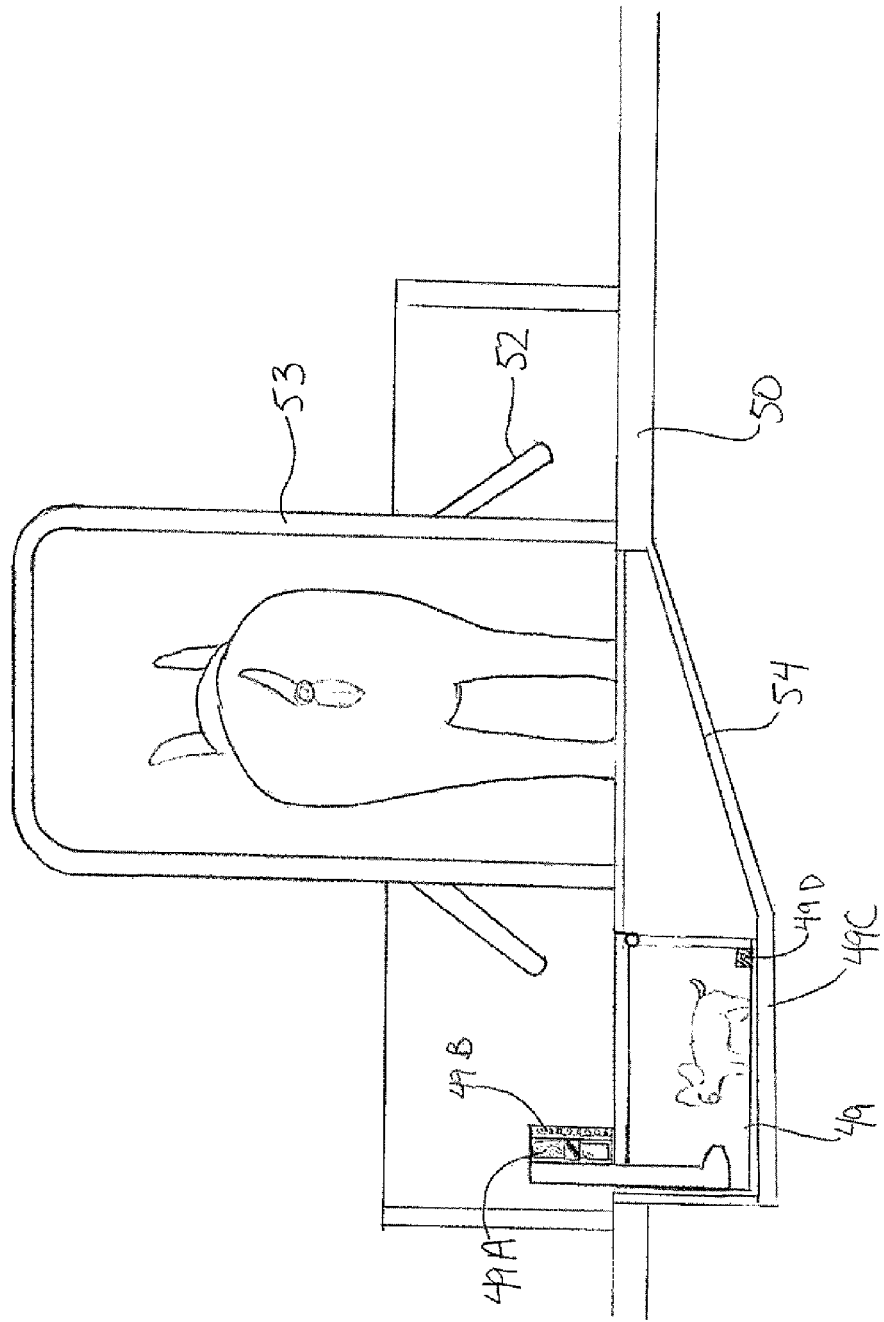
FIG. 7 is an end elevational view of a modified arrangement where the drying container is mounted under a floor of the pen so that the piglets at birth slide into the container automatically for drying.

FIG. 7 is an end elevational view of a modified arrangement where the drying container 49 with a fan 49A and heater 49B is mounted temporarily under a floor 50 of the pen 51 having anti-crush bars 52 on a frame 53 which confines the sow. A slide surface 54 is located at the rear of the pen so that the piglets at birth slide into the container 49 automatically for drying. The piglets can be removed manually by the worker when dried. This arrangement is thus used in conjunction with a system in which there is provided a compartment 49C at a level below the pen floor into which the container 49 is placed temporarily when required so that the piglets slide after birth and which protects them until they are ready to return to the pen to access the sow. Thus in the present arrangement, the piglets can automatically enter the drying device 49 and are allowed to leave only once they are dry. The system can include a detector 49D which operates to start automatically as the piglets enter.

Figure 8:
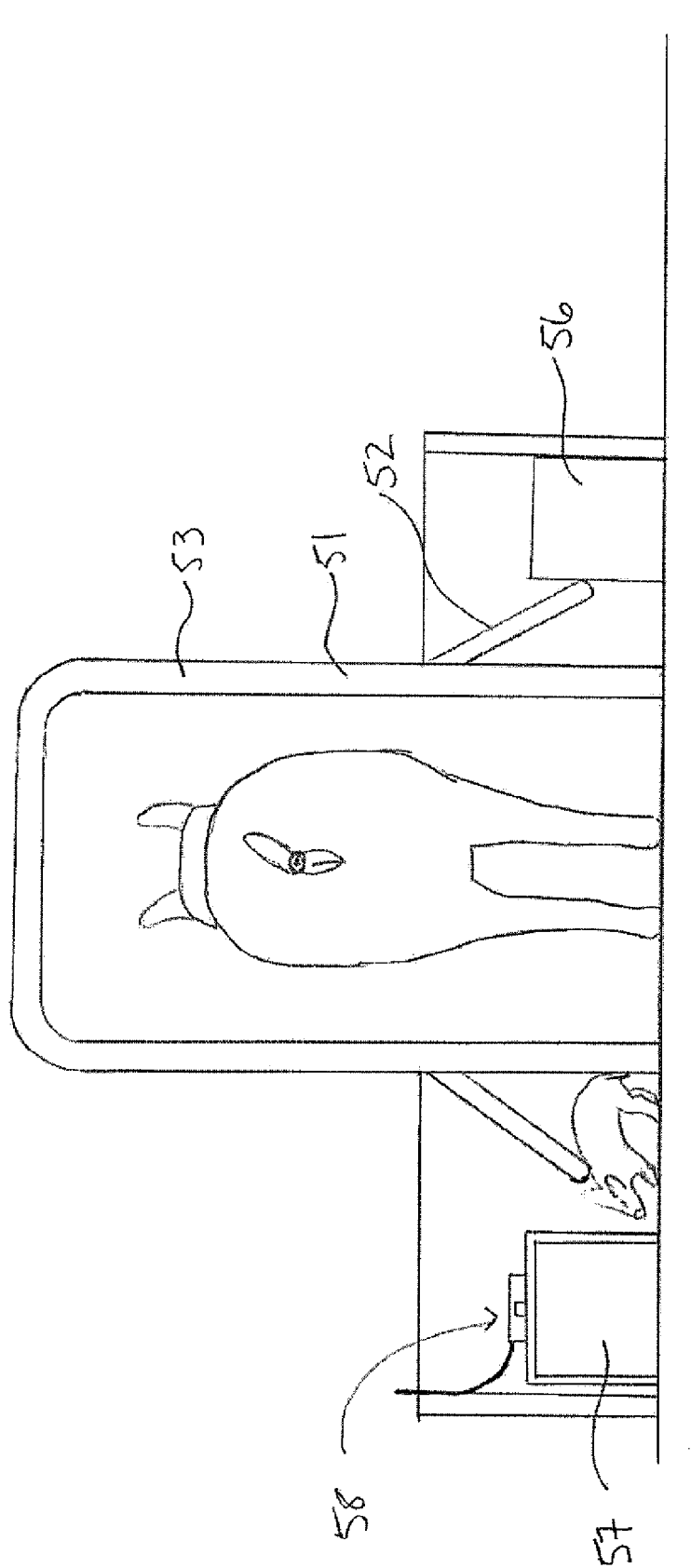
FIG. 8 is an end elevational view of a modified arrangement where the there are two base portions one on each side of the sow where the cover can be moved to one side or the other as required.

FIG. 8 is an end elevational view of a modified arrangement where the there are two base portions 56, 57 one on each side of the sow where the cover 58 can be moved to one side or the other as required.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for raising piglets comprising:
providing a farrowing pen for pregnant sows in a hog husbandry barn;
providing in the farrowing pen a container for receiving a plurality of piglets after birth of the piglets while the piglets are in a wet condition from the birthing process;
the container in the farrowing pen defining an open interior with a floor shaped and arranged to receive a plurality of piglets standing on the floor;
causing at least one of said plurality of piglets to be located in the container;
applying drying air movement to said at least one of said plurality of piglets within the container sufficient to cause drying of the piglets from the wet condition;
maintaining said at least one of said plurality of piglets confined with the container temporarily until substantially dried from the wet condition;
and releasing said at least one of said plurality of piglets from the container into the farrowing pen when substantially dried.

2. The method according to claim 1 wherein the container includes a closable opening for release of the piglets.

3. The method according to claim 2 wherein the closable opening is directed toward the nipples of the sow in the farrowing area.

4. The method according to claim 1 wherein there is provided an opening for manual insertion of said at least one of said plurality of piglets.

5. The method according to claim 1 wherein the container includes a base portion and a cover portion where the cover portion is lifted for manual insertion of said at least one of said plurality of piglets.

6. The method according to claim 1 wherein there is provided a plurality of separate base portions for said container each arranged to be located at a separate farrowing pen and associated with a separate cover portion which is movable from one base portion to another.

7. The method according to claim 6 wherein the cover portion includes the components for generating said air movement and/or heat.

8. The method according to claim 6 wherein each base portion includes a floor and an upstanding confining wall arrangement.

9. The method according to claim 1 wherein at least part of the container is transparent to allow viewing of the piglets by the worker.

10. The method according to claim 1 wherein at least part of the container is removable from the farrowing pen area after temporary use.

11. The method according to claim 1 wherein the container includes an exit door that automatically unlocks when the drying process is over.

12. The method according to claim 1 wherein the container includes a timer that stops the air movement automatically when the piglets are dry.

13. The method according to claim 12 wherein the timer has different modes to take into account the number of piglets to dry.

14. The method according to claim 13 wherein each mode is arranged to start the system with the proper configuration to efficiently dry the piglets.

15. The method according to claim 1 wherein the air movement is arranged so that the air velocity and turbulence act to break the thin skin layer from the birthing process.

16. The method according to claim 1 including detectors which carry out an analysis of system variables to determine when piglets are completely dry to stop the drying process.

17. A method for raising piglets comprising:
providing a farrowing pen for pregnant sows in a hog husbandry barn;
providing in the farrowing pen a container for receiving at least one of a plurality of piglets after birth of the piglets while the piglets are in a wet condition from the birthing process;
causing said at least one of said plurality of piglets to be located in the container;
applying drying air movement to said at least one of said plurality of piglets within the container sufficient to cause drying of the piglets from the wet condition;
maintaining said at least one of said plurality of piglets confined with the container temporarily until substantially dried from the wet condition;
causing an automatic detection by a timer when said at least one of said plurality of piglets is sufficiently dried from the wet condition;
and releasing said at least one of said plurality of piglets from the container into the farrowing pen in response to said timer.

18. The method according to claim 17 wherein the container includes an exit door that automatically unlocks in response to said timer.

19. A method for raising piglets comprising:
providing a farrowing pen for pregnant sows in a hog husbandry barn;
providing in the farrowing pen a container for receiving at least one of a plurality of piglets after birth of the piglets while the piglets are in a wet condition from the birthing process;
causing said at least one of said plurality of piglets to be located in the container;
applying drying air movement to said at least one of said plurality of piglets within the container sufficient to cause drying of the piglets from the wet condition;
maintaining said at least one of said plurality of piglets confined with the container temporarily until substantially dried from the wet condition;
causing an automatic detection by an analysis system when said at least one of said plurality of piglets is sufficiently dried from the wet condition;
and releasing said at least one of said plurality of piglets from the container into the farrowing pen in response to said automatic detection.

20. The method according to claim 19 wherein the container includes an exit door that automatically unlocks in response to said automatic detection.

21. A method for raising piglets comprising:
providing a farrowing pen for pregnant sows in a hog husbandry barn wherein the farrowing pen includes a floor on which the sow is contained;
providing in the farrowing pen a container at a level below the pen floor in which piglets slide after birth for receiving at least one of a plurality of piglets after birth of the piglets while the piglets are in a wet condition from the birthing process;
causing said at least one of said plurality of piglets to be located in the container which protects them until they are ready to return to the pen to access the sow;
applying drying air movement to said at least one of said plurality of piglets within the container sufficient to cause drying of the piglets from the wet condition;
maintaining said at least one of said plurality of piglets confined with the container temporarily until substantially dried from the wet condition;
and releasing said at least one of said plurality of piglets from the container into the farrowing pen.

22. A method for raising piglets comprising:
providing a plurality of farrowing pens each for receiving a pregnant sow in a hog husbandry barn;
providing a container for receiving at least one of a plurality of piglets after birth of the piglets while the piglets are in a wet condition from the birthing process;
causing said at least one of said plurality of piglets to be located in the container;
applying drying air movement to said at least one of said plurality of piglets within the container sufficient to cause drying of the piglets from the wet condition;
maintaining said at least one of said plurality of piglets confined with the container temporarily until substantially dried from the wet condition;
and releasing said at least one of said plurality of piglets from the container into the farrowing pen;
wherein there is provided a plurality of separate base portions for said container each arranged to be located in a respective one of said farrowing pens;
and wherein said container includes a respective one of said separate base portions and a separate cover portion which is movable from one base portion to another.

23. The method according to claim 22 wherein the cover portion includes the components for generating said air movement.

24. The method according to claim 22 wherein the cover portion includes a closable door.

25. The method according to claim 22 wherein the base portion includes a floor and an upstanding confining wall arrangement.

* * * * *